US008898698B2

United States Patent
Fleischman et al.

(10) Patent No.: US 8,898,698 B2
(45) Date of Patent: Nov. 25, 2014

(54) CROSS MEDIA TARGETED MESSAGE SYNCHRONIZATION

(75) Inventors: Michael Ben Fleischman, Somerville, MA (US); Deb Kumar Roy, Arlington, MA (US)

(73) Assignee: BlueFin Labs, Inc., Cambridge, MA (US)

( * ) Notice: Subject to any disclaimer, the term of this patent is extended or adjusted under 35 U.S.C. 154(b) by 0 days.

(21) Appl. No.: 13/355,332

(22) Filed: Jan. 20, 2012

(65) Prior Publication Data

US 2012/0192227 A1 Jul. 26, 2012

Related U.S. Application Data

(60) Provisional application No. 61/434,972, filed on Jan. 21, 2011.

(51) Int. Cl.

| *H04N 7/10* | (2006.01) |
| *H04N 7/025* | (2006.01) |
| *H04N 5/445* | (2011.01) |
| *H04N 21/24* | (2011.01) |
| *H04N 21/43* | (2011.01) |
| *H04N 21/81* | (2011.01) |
| *G06Q 10/00* | (2012.01) |
| *H04N 21/2543* | (2011.01) |

(52) U.S. Cl.
CPC ....... *H04N 21/4307* (2013.01); *H04N 21/2407* (2013.01); *H04N 21/812* (2013.01); *G06Q 10/00* (2013.01); *H04N 21/25435* (2013.01)
USPC .................................. 725/34; 725/9; 725/37

(58) Field of Classification Search
None
See application file for complete search history.

(56) References Cited

U.S. PATENT DOCUMENTS

| 7,526,506 | B2 * | 4/2009 | Cho et al. ............................... 1/1 |
| 7,853,969 | B2 * | 12/2010 | Smith et al. ...................... 725/22 |
| 2003/0229900 | A1 | 12/2003 | Reisman |

(Continued)

FOREIGN PATENT DOCUMENTS

WO    WO 2011/009101 A1    1/2011

OTHER PUBLICATIONS

Bouthemy, P. et al., "A Unified Approach to Shot Change Detection and Camera Motion Characterization," IEEE Trans. on Circuits and Systems for Video Technology, Oct. 1999, vol. 9, No. 7.

(Continued)

*Primary Examiner* — Nasser Goodarzi
*Assistant Examiner* — Adil Ocak
(74) *Attorney, Agent, or Firm* — Fenwick & West LLP

(57) ABSTRACT

Social media content items and references to events that occur therein are aligned with the time-based media events they describe. These mappings may be used as the basis for sending messages to populations of authors of content items, where the populations are determined based on whether the author has written a content item that refers to a specific TV show or advertisement. TV streams are monitored to detect when and where a specific advertisement for a particular advertiser is shown. Concurrently, social media streams are monitored for content items that refer to or are about specific TV shows and advertisements. Responsive to a specific advertisement being detected as being shown during a specific TV show, a message associated with the advertisement is sent to the authors of the content items associated with that TV show or advertisement. The messages can be transmitted while the advertisement is being shown.

23 Claims, 8 Drawing Sheets

(56) References Cited

U.S. PATENT DOCUMENTS

| | | | |
|---|---|---|---|
| 2004/0117831 A1* | 6/2004 | Ellis et al. | 725/53 |
| 2007/0006277 A1* | 1/2007 | Mills et al. | 725/153 |
| 2008/0215607 A1 | 9/2008 | Kaushansky et al. | |
| 2009/0133093 A1* | 5/2009 | Hodge | 725/137 |
| 2009/0241145 A1* | 9/2009 | Sharma | 725/43 |
| 2009/0249244 A1* | 10/2009 | Robinson et al. | 715/781 |
| 2009/0313324 A1* | 12/2009 | Brooks et al. | 709/203 |
| 2010/0287236 A1 | 11/2010 | Amento et al. | |
| 2010/0333127 A1* | 12/2010 | Scott et al. | 725/24 |

OTHER PUBLICATIONS

Fleischman, M. et al., "Unsupervised Content-Based Indexing of Sports Video Retrieval," 9th ACM Workshop on Multimedia Information Retrieval (MIR), Augsburg, Germany, Sep. 2007, 9 pages.

Hauptmann, A. et al., "Story Segmentation and Detection of Commercials in Broadcast News Video," ADL-98 Advances in Digital Libraries Conference, Santa Barbara, CA, Apr. 22-24, 1998, 12 pages.

Jacobs, A. et al., Automatic Shot Boundary Detection Combining Color, Edge, and Motion Features of Adjacent Frames, Center for Computing Technologies, Bremen, Germany, 2004, 10 pages.

PCT International Search Report and Written Opinion, PCT Application No. PCT/US12/22112, Apr. 15, 2013, 16 pages.

Tardini et al., "Shot Detection and Motion Analysis for Automatic MPEG-7 Annotation of Sports Videos," 13th International Conference on Image Analysis and Processing, Nov. 2005, 8 pages.

\* cited by examiner

CROSS MEDIA TARGETED MESSAGE SYNCHRONIZATION

PRIORITY INFORMATION

This application claims priority under 35 U.S.C. §119(e) to U.S. Provisional Patent Application No. 61/434,972, filed on Jan. 21, 2011 and entitled "Cross Media Targeted Message Synchronization," which is hereby incorporated herein by reference.

FIELD OF THE INVENTION

The present invention relates generally to using social media to send targeted advertisements to viewers of media content, and in particular to correlating viewers of media content with authors of social media content.

BACKGROUND OF THE INVENTION

Online social media services, such as social networking sites, search engines, news aggregators, blogs, and the like provide a rich environment for users to comment on events of interest and communicate with other users. Content items authored by users of these social media services often include references to events that appear in time based media such as television shows, news reports, sporting events, movies, concert performances, and the like. However, although the content items can sometimes refer to the time-based media, the social media content items themselves typically are isolated from the events and time-based media that those content items refer to.

SUMMARY OF THE INVENTION

Social media content items and references to events that occur therein are aligned with the time-based media events they describe. These mappings may be used as the basis for performing cross media targeted message synchronization. Cross media targeted message synchronization sends social media messages to specific populations of authors of social media content items, where the populations are determined based on whether the author has written a content item that refers to a specific television show or advertisement. This approach leverages the investment that advertisers make in television advertising by coupling such advertisements to highly targeted messaging.

In one embodiment, one or more television streams are monitored to detect when and where (e.g., channel, media market, geographic region) a specific advertisement for a particular advertiser is shown. The television show during which the specific advertisement is shown is determined from program guide and schedule information for the channel and time of the specific advertisement. Concurrently, social media streams are monitored for social media content items that refer to or are about specific television shows and advertisements. In one embodiment, metadata associated with the television shows and ads, such as the show's title, character names, actor names, plot aspects, or the like, is stored. Social media items that contain content associated with (e.g., matching or "aligning") the metadata for the television show and ads are identified and stored. Information identifying the users who created these content items (also referred to as "authors") is maintained, including information about their posted content, and the social media stream into which the posts were made.

Responsive to a specific advertisement being detected as being shown during a specific television show, a social media message associated with the advertiser for the advertisement is sent to the authors of the social media content items associated with that television show or advertisement. The messages can be transmitted during, within a limited time period after, or any time after the advertisement is aired.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
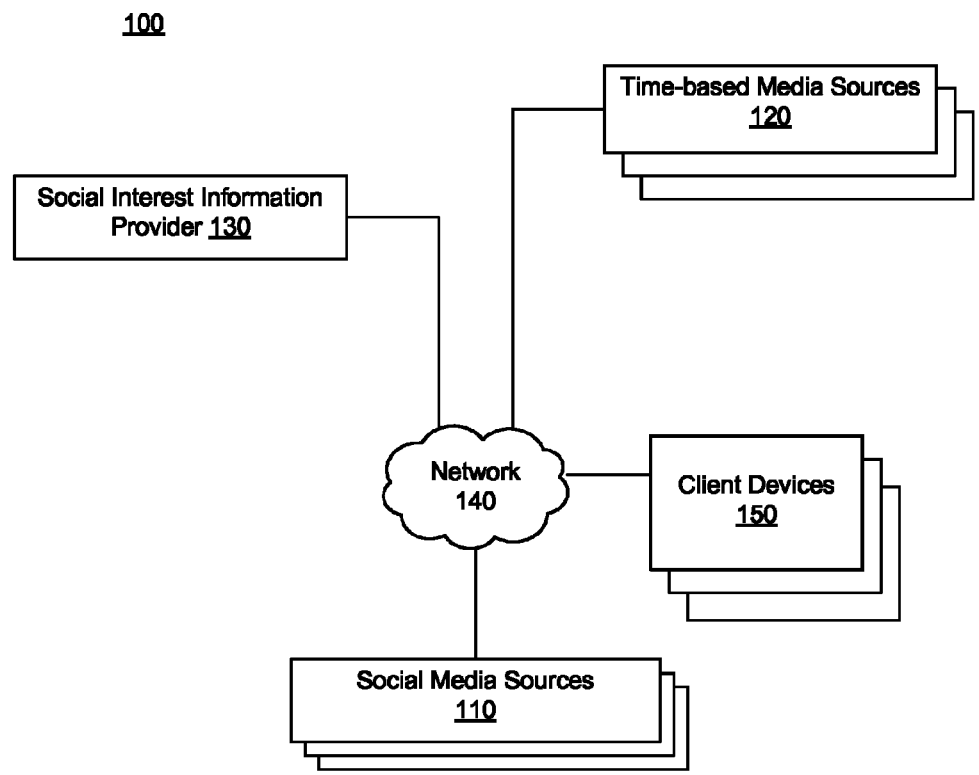
FIG. 1 illustrates the computing environment of one embodiment of a system for associating social media content items with time-based media events and determining social interest in the events based on the resulting associations.

FIG. 1 illustrates the computing environment 100 for one embodiment of a system 130 for associating social media content items and references to events therein with time-based media events and determining cross media targeted message synchronization based on the resulting associations.

The environment 100 includes social media sources 110, time-based media sources 120, the social interest information provider 130, a network 140, and client devices 150.

The social media sources 110 include social networks, blogs, news media, forums, user groups, etc. These sources generally provide a plurality of users with the ability to communicate and interact with other users of the source. Users can typically contribute various content items (e.g., posts, videos, photos, links, status updates, blog entries, tweets, and the like), which may refer to media events, and can engage in discussions, games, online events, and other participatory services.

The time-based media sources 120 include broadcasters, direct content providers, advertisers, and any other third-party providers of time-based media content. These sources 120 typically publish content such as television programs, videos, movies, serials, audio recordings, and the like.

Figure 2:
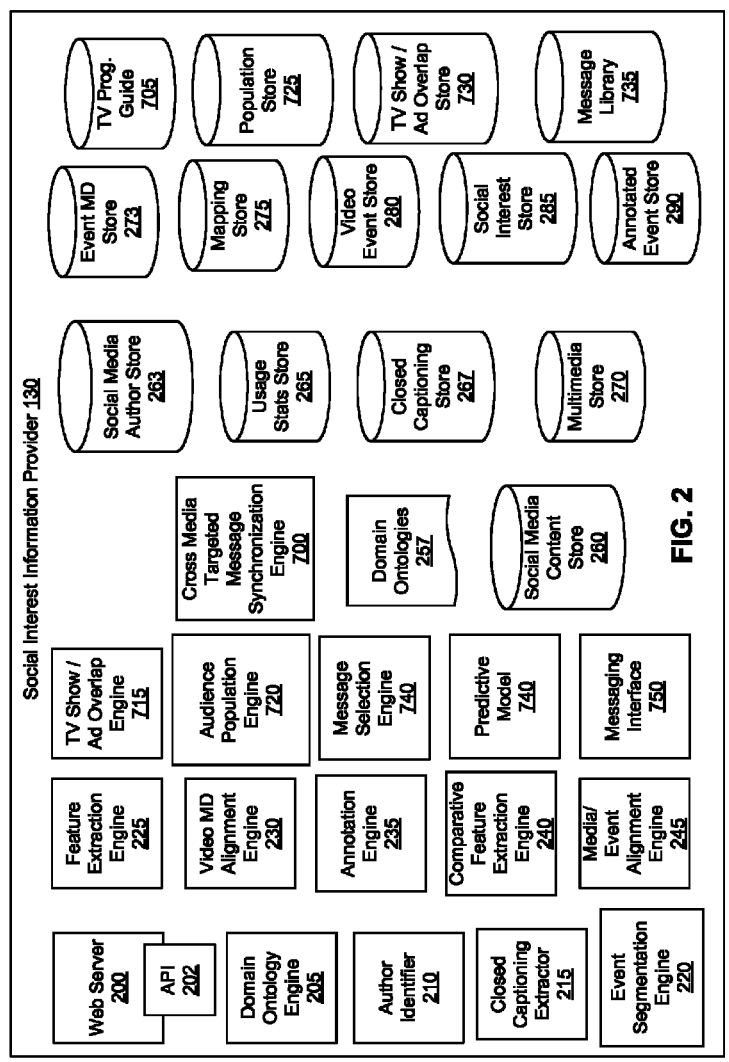
FIG. 2 is a block diagram of one embodiment of a social interest information provider.

The social interest information provider 130 provides a system for associating social media content items and references to events therein with time-based media events and providing cross media targeted message synchronization events based on the resulting associations, and is further described in conjunction with FIG. 2.

The network 140 may comprise any combination of local area and/or wide area networks, the Internet, or one or more intranets, using both wired and wireless communication systems.

The client devices 150 comprise computing devices that can receive input from a user and can transmit and receive data via the network 140. For example, client devices 150 may be a desktop computer, a laptop computer, a smart phone, a personal digital assistant (PDAs), or any other device including computing functionality and data communication capabilities. A client device 150 is configured to communicate with the social media sources 110 and the social interest information provider system 130 via the network 140.

FIG. 2 is a block diagram of one embodiment of a social interest information provider 130. The embodiment of the social interest information provider 130 shown in FIG. 2 is a computer system that includes a web server 200 and associated API 202, a domain ontology engine 205, an author identifier 210, a closed captioning extractor 215, an event segmentation engine 220, a feature extraction engine 225, a metadata alignment engine 230, an annotation engine 235, a comparative feature extraction engine 240, a media event/alignment engine 245, a social interest estimator 250, a user interface engine 255, domain ontologies 257, a social media content store 260, a social media author store 263, a usage stats store 265, a closed captioning store 267, a multimedia store 270, an event metadata store 273, a mapping store 275, a video event store 280, a social interest store 285, an annotated event store 290, a TV show/ad overlap engine 715, an audience population engine 720, a message selection engine 740, a predictive model 745, a messaging interface 750, a TV programming guide 705, a population store 725, a TV show/ad overlap store 730, and a message library 735.

This system may be implemented using a single computer, or a network of computers, including cloud-based computer implementations. The computers are preferably server class computers including one or more high-performance CPUs, 1 G or more of main memory, as well as 500 GB to 2 Tb of computer readable, persistent storage, and running an operating system such as LINUX or variants thereof. The operations of the system 130 as described can be controlled through either hardware or through computer programs installed in computer storage and executed by the processors of such servers to perform the functions described herein. The system 130 includes other hardware elements necessary for the operations described here, including network interfaces and protocols, security systems, input devices for data entry, and output devices for display, printing, or other presentations of data; these and other conventional components are not shown so as to not obscure the relevant details.

As noted above, system 130 comprises a number of "engines," which refers to computational logic for providing the specified functionality. An engine can be implemented in hardware, firmware, and/or software. An engine may sometimes be equivalently referred to as a "module" or a "server." It will be understood that the named components represent one embodiment of the present invention, and other embodiments may include other components. In addition, other embodiments may lack the components described herein and/or distribute the described functionality among the components in a different manner. Additionally, the functionalities attributed to more than one component can be incorporated into a single component. Where the engines described herein are implemented as software, the engine can be implemented as a standalone program, but can also be implemented through other means, for example as part of a larger program, as a plurality of separate programs, or as one or more statically or dynamically linked libraries. In any of these software implementations, the engines are stored on the computer readable persistent storage devices of the system 130, loaded into memory, and executed by the one or more processors of the system's computers. The operations of the system 130 and its various components will be further described below with respect to FIG. 2 and the remaining figures. As will become apparent, the various data processing operations described herein are sufficiently complex and time consuming as to require the operation of a computer system such as the system 130.

The web server 200 links the social interest information provider 130 to the client devices 150, the time-based media sources 120, and the social media sources 110 via network 140, and is one means for doing so. The web server 200 serves web pages, as well as other web related content, such as Java, Flash, XML, and so forth. The web server 200 may include a mail server or other messaging functionality for receiving and routing messages between the social interest information provider 130 and client devices 150.

The API 202, in conjunction with web server 200, allows one or more external entities to access information from the social interest information provider 130. The web server 200 may also allow external entities to send information to the social interest information provider 130 calling the API 202. For example, an external entity sends an API request to the social interest information provider 130 via the network 140 and the web server 200 receives the API request. The web server 200 processes the request by calling an API 202 associated with the API request to generate an appropriate response, which the web server 200 communicates to the external entity via the network 140. The API 202 can be used for the social interest information provider 130 to receive extracted features and other inputs to the social media/event alignment 330.

The action logger 215 is capable of receiving communications from the web server 210 about user actions on and/or off the social networking system 130. The action logger 215 populates the action log 230 with information about user actions, allowing the social networking system 130 to track various actions taken by its users within the social networking system 130 and outside of the social networking system 130. Any action that a particular user takes with respect to another user is associated with each user's profile, through information maintained in the action log 230 or in a similar database or other data repository. Examples of actions taken by a user within the social network 130 that are identified and stored may include, for example, adding a connection to another user, authoring a message and broadcasting it or sending it to another user, and reading a message from another user.

Domain ontology engine 205 provides domain ontologies indicating vocabularies specific to different media domains for storage in the domain ontologies 257, and is one means for doing so. The domain ontologies 257 encode information relevant to specific domains, and are beneficial, since nicknames, slang, acronyms, and other shortened terms commonly are used in certain domains. Domain ontologies 257 may be organized hierarchically as graphs, where each node in the graph represents a concept (e.g. "football play," "scoring play") and each edge represents a relation between concepts (e.g. "type of"). Concept instances (e.g., a specific touchdown play from a specific football game) may also be encoded in the domain ontology, as well as, vocabularies that provide alternate terminology for concept nodes (e.g. "TD" for concept "touchdown"). The domain ontologies 257 may be engineered based on the knowledge of human experts or machine-generated. The domain ontologies are used for initial filtering of social media posts and in the social media/event alignment process. An exemplary list of social interest domains for which time-based media is used according to the present invention includes broadcast video such as television programs, such as sports, news, episodic television, reality/live event shows, movies, and advertising in conjunction with any of these domains. More specific domains also are possible, e.g., football games, entertainment news, specific reality TV shows, etc., each of which may have their own domain-specific ontology. The domain ontology engine 205 is configured to filter the time segments according to a search term, wherein the graphical display displays only a subset of the series of chronological time segments corresponding to the search term.

The author identifier 210 identifies the author, or provider, of each social media content item, e.g., as provided to the social interest information provider 130 by the social media sources 110 with the content items, and is one means for doing so. Additional information about the authors may be extracted from the content items themselves, e.g., as stored in the social media content store 260, or extracted from other external sources. The author information is stored in the social media author store 263.

The closed captioning extractor 215 extracts closed captioning data from the time-based media, and is one means for doing so. Closed captioning data typically can be extracted from broadcast video or other sources encoded with closed captions using open source software such as CCExtractor available via SourceForge.net. For time-based media not encoded with closed captioning data, imperfect methods such as automatic speech recognition can be used to capture and convert the audio data into a text stream comparable to closed captioning text. This can be done, for example, using open source software such as Sphinx 3 available via SourceForge.net. Once the closed captioning is ingested, it is preferably aligned to speech in a video. Various alignment methods are known in the art. One such method is described in Hauptmann, A. and Witbrock, M., *Story Segmentation and Detection of Commercials in Broadcast News Video*, ADL-98 Advances in Digital Libraries Conference, Santa Barbara, Calif. (April 1998), which uses dynamic programming to align words in the closed captioning stream to the output of a speech recognizer run over the audio track of the video. The closed captioning information is stored in the closed captioning store 267.

The multimedia store 270 stores various forms of time-based media. Time-based media includes any data that changes meaningfully with respect to time. Examples include, and are not limited to, videos, (e.g., television programs or portions thereof, movies or portions thereof) audio recordings, MIDI sequences, animations, and combinations thereof. Time-based media can be obtained from a variety of sources, such as local or network stores, as well as directly from capture devices such as cameras, microphones, and live broadcasts. It is anticipated that other types of time-based media within the scope of the invention will be developed in the future (e.g., 3D media, holographic presentations, immersive media, and so forth).

The event segmentation engine 220 segments time-based media into semantically meaningful segments corresponding to discrete portions or "events," and is one means for doing so. Different types of media may have different types of events which are recognized as part of a video event segmentation process. For example, a television program or movie may have scenes and shots; a sporting event may have highly granular events (e.g., plays, passes, catches, hits, shots, baskets, goals, and the like) as well has less granular events (e.g., sides, downs, innings, and the like). A new program may have events such as stories, interviews, shots, commentary and the like. The video event segmentation process includes three main components according to one embodiment: shot boundary detection, event detection, and boundary determination. These components for event segmentation may vary by domain. The output of video event segmentation is a set of segmented video events that is stored in the video event store 280.

The feature extraction engine 225 converts segmented time-based media events retrieved from the video event store 280 into feature vector representations for aligning the events with metadata, and is one means for doing so. The features may include image and audio properties and may vary by domain. Feature types may include, but are not limited to, scale-variant feature transform (SIFT), speeded up robust features (SURF), local energy based shape histogram (LESH), color histogram, and gradient location orientation histogram (GLOH).

The metadata alignment engine 230 aligns video event segments with semantically meaningful information regarding the event or topic that the event is about, and is one means for doing so. The metadata alignment engine 230 uses metadata instances from the event metadata store 273. A metadata instance is the metadata for a single event, i.e., a single piece of metadata. The annotation engine 235 annotates the segments with the metadata, and is one means for doing so. Metadata instances may include automatic annotations of low level content features, e.g., image features or content features, hand annotations with text descriptions, or both. The metadata may be represented as text descriptions of time-based media events and/or feature vector representations extracted from examples of events. The annotations are stored in the annotated event store 290.

The comparative feature extraction engine 240 converts an annotated event and a corresponding social media content item into a feature vector representation, and is one means for doing so. The three major types of features extracted by the comparative feature extraction engine 240 are content features, geo-temporal features, and authority features. The media/event alignment engine 245 aligns the social media content item 610 and annotated event 530 using the extracted features 620, and is one means for doing so. The media/event alignment engine 245 outputs an annotated event/social media mapping and associated confidence score to the mapping store 275.

The following is a non-comprehensive list of media types that can be associated with time-based media: audio of commentators on, or participants of, the event or topic (e.g., announcers on TV or radio) and text transcriptions thereof (generated manually or automatically), event-related metadata (e.g., recipes, instructions, scripts, etc.), statistical data (e.g., sports statistics or financial data streams), news articles, social media content items, and media usage statistics (e.g., user behavior such as viewing, rewind, pausing, etc.). The social media content items include long form and short form social media content items such as posts, videos, photos, links, status updates, blog entries, tweets, and the like from various social media and mainstream news sources that are stored in the social media content store 260. In general, social networks allow their users to publish text-based content items to other members of their network, which content items may be open and viewable by the public through open application program interfaces.

Typically social media content items are of two varieties: static text-based media and dynamic text-based media. Static text-based media describes a large class of information on the Internet (e.g., blogs, news articles, webpages, etc.). This information changes only minimally once posted (i.e., is relatively static) and is entirely made up of words (i.e., is text-based). Dynamic text-based media refer to any of a set of "data feeds" composed of short, frequently updated user posts to social network websites that often describe the states and opinions of their authors.

For some domains, usage statistics may be ingested, either alone or generated from the time-based media in the multimedia store 270, and stored in the usage stats store 265. Usage statistics may include information regarding how the multimedia data was consumed, e.g., number of views, length of views, number of pauses, time codes at which a pause occurs, etc. The statistics can be aggregated with respect to different populations, such as by user type, location, usage type, media type, and so forth. The statistics can represent means, modes, medians, variances, rates, velocities, population measures, and the like.

The TV show/ad overlap engine 715, audience population engine 720, message selection engine 740, predictive model 745, messaging interface 750, TV programming guide 705, population store 725, TV show/ad overlap store 730, and a message library 735 are described below with respect to FIG. 7.

Mapping Social Media Content Items to Time-Based Media

Figure 3:
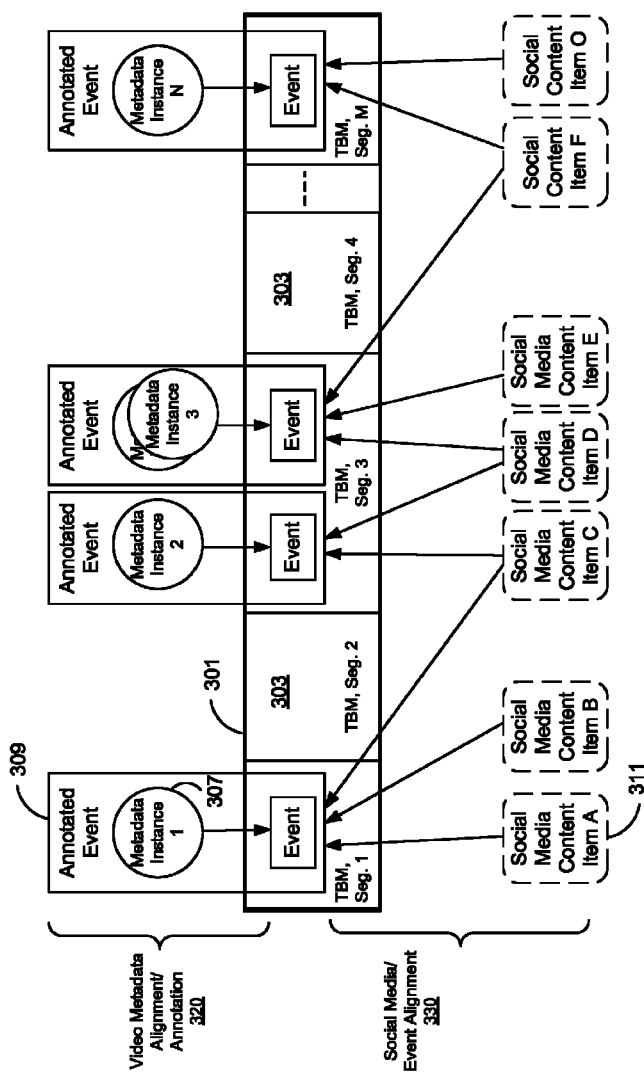
FIG. 3 is a conceptual diagram illustrating the video/metadata alignment/annotation and social media/event alignment processes at a high level according to one embodiment.

FIG. 3 is a conceptual diagram illustrating the video/metadata alignment/annotation 320 and social media/event alignment 330 processes at a high level according to one embodiment. Beginning with metadata instances 307 and events in time-based media 301 as input, annotated events 309 are formed. As shown, time-based media (TBM) 301 includes multiple segments (seg. 1-M) 303, which contain events in the time-based media, as described herein. The video/metadata alignment/annotation 320 process aligns one or more metadata instances (1-N) 307 with the events to form annotated events 309, as further described in conjunction with FIG. 5. The social media/event alignment 330 process aligns, or "maps," the annotated events 309 from the video/metadata alignment/annotation 320 to one or more social media content items (A-O) 311, as further described in conjunction with FIG. 6. Note that in both processes 320, 330, the various alignments are one-to-one, many-to-one, and/or many-to-many. Thus, a given social media content item 311 can be mapped to multiple different annotated events 309, and an annotated event 309 can be mapped to multiple different social media content items 311. Once so mapped, the relationships between content items and events can be quantified to estimate social interest, as further explained below.

Figure 3A:
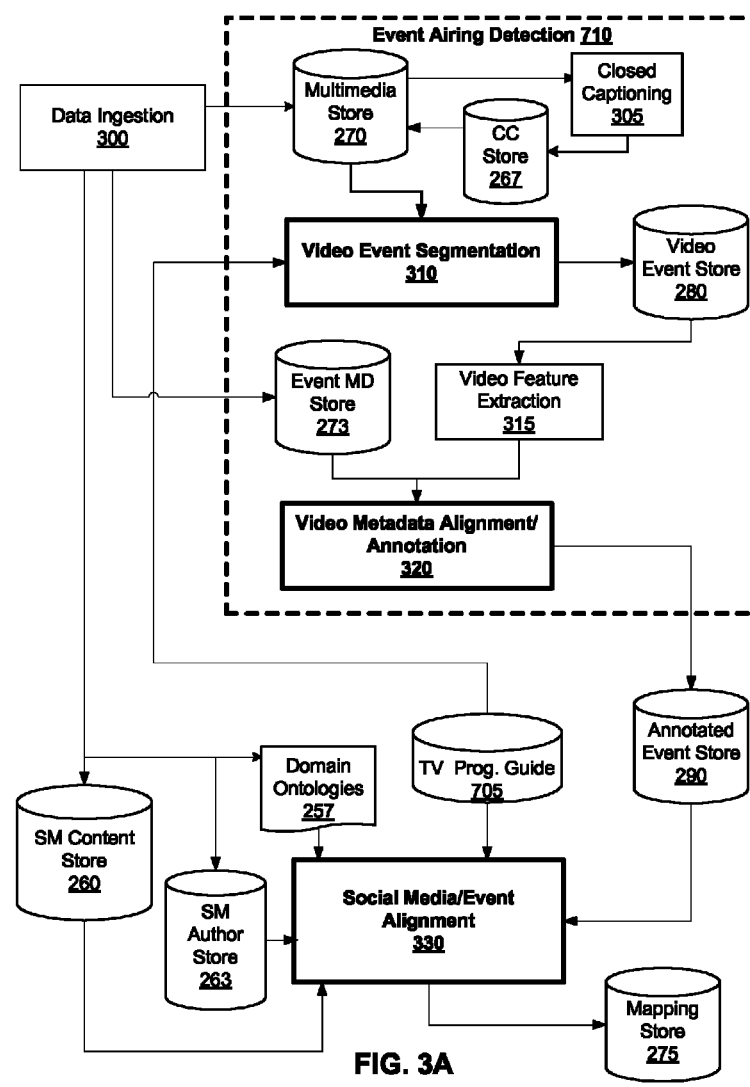
FIG. 3A is a flow diagram illustrating one embodiment of a method for associating social media content items with time-based media events, and a related method of determining social interest in the events based on the resulting associations.

FIG. 3A is a flow diagram illustrating one embodiment of a method for aligning social media content items (and references to events therein) with time-based media events, and a related method of detecting ad airings based on video metadata alignment.

Generally, social media content items are candidates for aligning with time-based media events, and a confidence score is determined for each indicative of a probability that the content item is relevant to the event. Based on the confidence scores, the content items may be aligned with the event, and the alignments are collected in a data store. The confidence scores are aggregated to produce an aggregate score.

As a preliminary step in the method, multiple streams of data are ingested 300 at the social interest information provider 130 for processing. Data may be received at the social interest information provider 130 directly from content providers, or via social media sources 110 or time-based media sources 120, e.g., from broadcast television feeds, directly from content producers, and/or from other third parties. In one embodiment, web server 200 is one means for ingesting 300 the data. The types of data may include, but are not limited to, time-based media, closed captioning data, statistics, social media posts, mainstream news media, and usage statistics, such as described above.

The ingested data is stored in data stores specific to one or more data types that serve as the input data sources for the primary processes of the method of FIG. 3A (each shown in bold). For example, time-based media data is stored in the multimedia store 270. The time-based media in the multimedia store 270 may undergo additional processing before being used within the methods shown in FIGS. 3-7. For example, closed captioning data can be extracted from, or created for 305, the time-based media, e.g., by closed captioning extractor 215. In addition, for some domains, usage statistics may be ingested, either alone or generated from the time-based media in the multimedia store 270, and stored in the usage stats store 265. In addition, event metadata associated with multimedia is stored in the event metadata store 273, social media content items as described herein are stored in the social media content store 260, information about authors of social media content items are stored in the social media author store 263, and domain ontologies indicating, for example, vocabularies specific to different media types, are stored in the domain ontologies 257.

As a result of the ingestion referenced above, the multimedia store 270 includes various forms of time-based media. The time-based media may be of various types, as described in conjunction with FIG. 2.

As shown in FIG. 3A, there are three major processes involved in the method according to the depicted embodiment: video event segmentation 310, video metadata alignment/annotation 320, and social media/event alignment/mapping 330. Each of these processes 310-330 are described below. Further, for advertisement type media, the video event segmentation 310 and video metadata alignment 320 processes may be collectively referred to as an event airing detection process 710.

Video Event Segmentation

The first process is video event segmentation 310, in which the time-based media is segmented into semantically meaningful segments corresponding to discrete events depicted in video. The input to the video event segmentation 310 process is a raw video (and/or audio) stream that is retrieved from the multimedia store 270 according to one embodiment, and may be performed, e.g., by the event segmentation engine 220, which is one means for performing this function.

The video event segmentation 310 process is domain dependent to some extent, e.g., in video of sporting events, event segments may be equated with individual plays, while in broadcast television, event segments may be equated with whole shows, individual scenes and/or advertisements. Thus the event types and segment size may vary based on the domain type, and for some media, e.g., short format media such as very short video clips, the entire clip is treated as one segment. They system may be pre-configured with information about to which domain the video belongs. This configuration may be implemented by hand on a case by case basis, or based on a preloaded schedule based on the source of video and time of day (using, for example, a programming guide of broadcast television shows 705).

Segmentation may be achieved via human annotation, known automated methods, or a hybrid human/automatic approach in which automatic segment boundaries are corrected by human annotators according to various embodiments. One automated method is described in Fleischman, M. and Roy, D., *Unsupervised Content-Based Indexing of Sports Video Retrieval*, 9th ACM Workshop on Multimedia Information Retrieval (MIR), Augsburg, Germany (September 2007).

The video event segmentation 310 process includes three main components according to one embodiment: shot boundary detection, event detection, and boundary determination. These components may vary by domain. For example, for sporting events an additional component may correspond to scene classification (e.g., field or stadium identification).

The output of video event segmentation 310 is a set of segmented video events that are stored in the video event store 280. Video event segmentation 310 is described in further detail in conjunction with FIG. 4.

Video Metadata Alignment/Annotation

The next process is metadata alignment/annotation 320, in which the segments from video event segmentation 310 are annotated with semantically meaningful information regarding the event that the segment is relevant to, or depicts. Input to metadata alignment/annotation 320 is a video event retrieved from the video event store 280 and metadata from the event metadata store 273. Such metadata can include, but is not limited to: the type of event occurring, the agents involved in the event, the location of the event, the time of the event, the results/causes of the event, etc.

As with event segmentation 310, the metadata alignment/annotation 320 process is domain dependent. For example, in American football, metadata for an event may include information such as "Passer: Tom Brady, Result: Touchdown, Receiver: Randy Moss," while metadata for an event in a Television series may include information such as: "Agent: Jack Bauer, Location: White House, Time: 3:15 pm," and for an advertisement the metadata may include information such as "Brand: Walmart, Scene: father dresses up as clown, Mood: comic." As illustrated in these examples, the metadata can be structured as tuples of <name, value> pairs.

The metadata includes text and, for certain domains, lower level image and audio properties. Metadata may be generated using human annotation (e.g., via human annotators watching events or samples thereof) and, in certain domains, may be supplemented with automatic annotations for use in the alignment process (e.g., describing lower level image and audio properties of the event such as number and length of each shot, average color histograms of each shot, power levels of the associated audio, etc.) The annotation is stored in the annotated event store 290.

Metadata alignment/annotation 320 includes two steps according to one embodiment: event feature extraction and video metadata alignment. Metadata alignment/annotation 320 is described in further detail in conjunction with FIG. 5.

According to another embodiment, data ingestion 300, video event segmentation 310, and video metadata alignment 320 (or, collectively, event airing detection 710) could be performed by a separate entity, such as a content provider or owner, e.g., which does not want to release the content to others. In this embodiment, the social interest information provider 130 would provide software, including the software modules and engines described herein, to the separate entity to allow them to perform these processes on the raw time-based media. The separate entity in return could provide the social interest information provider 130 with the extracted features and other inputs to the social media/event alignment 330 process, which then would be used by the social interest information provider 130. These data exchanges could take place via an application programming interface (API) provided by the social interest information provider 130 and exposed to the separate entity, e.g., via web server 200. The social interest information provider 130 would then perform, for example, cross media targeted synchronization on behalf of the entity.

Social Media/Event Alignment

The next step is to integrate the annotated time-based media event segments with social media content items that refer to the events. Input to social media/event alignment 330 according to one embodiment is an annotated event retrieved from the annotated event store 290, a social media content item retrieved from the social media content store 260, a domain ontology retrieved from the domain ontologies 257, and optionally author information about the social media content item author retrieved from the social media author store 263.

Unfortunately, social media content items often are ambiguous as to whether they refer to an event at all, and if so, which event they refer to. For example, a simple social media content item, such as the single word post "Touchdown!" may refer to an event in a football game, or it may be used as a metaphor for a success in areas unrelated to football. In order to address such ambiguities, the social media/event alignment 330 determines a confidence score that a given social media content item refers to a specific event. The method takes as input a single social media content item and a single annotated event, and outputs a score representing the confidence (i.e., likelihood, probability) that the social media content item is relevant to the event. A social media content item can be relevant to an event by referring to the event. The social media/event alignment 330 function operates on features of the individual social media content items and annotated events, and can be trained using supervised learning methods or optimized by hand. The media/event alignment engine 245 is one means for performing this function.

The output of social media/event alignment 330 is a mapping between an annotated event and a social media content item (and/or references to events therein) and an associated confidence score. The mapping and confidence score are stored in a mapping store 275. The social media/event alignment 330 process is described in further detail in conjunction with FIG. 6.

The mappings output by social media/event alignment 330 are useful in and of themselves, as they may be used as the basis for multiple applications, such as, ranking of search results for time-based media, automatic recommendations for time-based media, prediction of audience interest for media purchasing/planning, estimation of social interest, and performing cross media targeted message synchronization.

Video Event Segmentation

Figure 4:
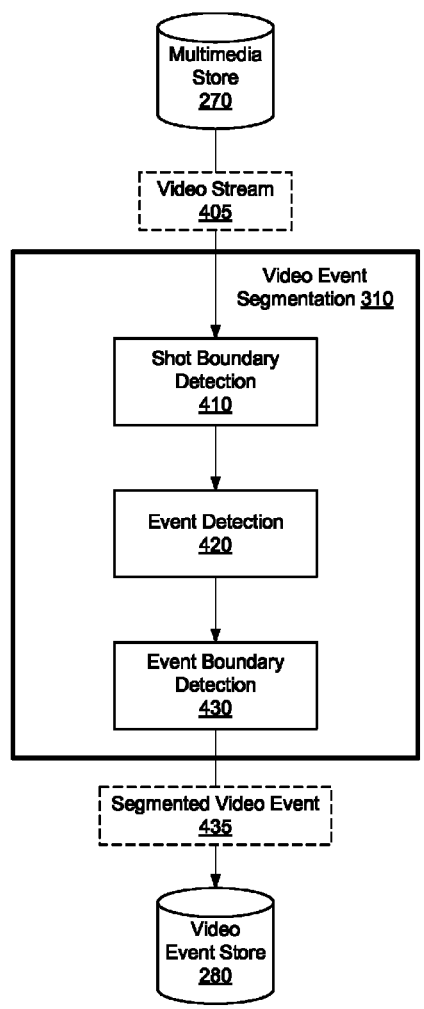
FIG. 4 is a flow diagram illustrating one embodiment of a video event segmentation process.

FIG. 4 is a flow diagram illustrating one embodiment of a video event segmentation process 310. As described in FIG. 3A, video event segmentation 310 segments time-based media into semantically meaningful segments corresponding to discrete video portions or "events," e.g., via event segmentation engine 220, which is one means for performing this function.

Input to the video event segmentation process 310 is a video stream 405 from the multimedia store 270. Video event segmentation 310 includes 3 phases: shot boundary detection 410, event detection 420, and event boundary determination 430, each of which is described in greater detail below. The output of video event segmentation 310 is a segmented video event 435, which is stored in the video event store 280.

Shot Boundary Detection

The first step in segmenting is shot boundary detection 410 for discrete segments (or "shots") within a video. Shot boundaries are points of non-continuity in the video, e.g., associated with a change in a camera angle or scene. Shot boundaries may be determined by comparing color histograms of adjacent video frames and applying a threshold to that difference. Shot boundaries may be determined to exist wherever the difference in the color histograms of adjacent frames exceeds this threshold. Many techniques are known in the art for shot boundary detection. One exemplary algorithm is described in Tardini et al., *Shot Detection and Motion Analysis for Automatic MPEG-7 Annotation of Sports Videos*, 13th International Conference on Image Analysis and Processing (November 2005). Other techniques for shot boundary detection 410 may be used as well, such as using motion features. Another known technique is described in A. Jacobs, et al., *Automatic shot boundary detection combining color, edge, and motion features of adjacent frames*, Center for Computing Technologies, Bremen, Germany (2004).

Event Detection

Event detection 420 identifies the presence of an event in a stream of (one or more) segments using various features corresponding, for example, to the image, audio, and/or camera motion for a given segment. A classifier using such features may be optimized by hand or trained using machine learning techniques such as those implemented in the WEKA machine learning package described in Witten, I. and Frank, E., *Data Mining: Practical machine learning tools and techniques* (2nd Edition), Morgan Kaufmann, San Francisco, Calif. (June 2005). The event detection process 420 details may vary by domain.

Image features are features generated from individual frames within a video. They include low level and higher level features based on those pixel values. Image features include, but are not limited to, color distributions, texture measurements, entropy, motion, detection of lines, detection of faces, presence of all black frames, graphics detection, aspect ratio, and shot boundaries.

Speech and audio features describe information extracted from the audio and closed captioning streams. Audio features are based on the presence of music, cheering, excited speech, silence, detection of volume change, presence/absence of closed captioning, etc. According to one embodiment, these features are detected using boosted decision trees. Classification operates on a sequence of overlapping frames (e.g., 30 ms overlap) extracted from the audio stream. For each frame, a feature vector is computed using Mel-frequency cepstral coefficients (MFCCs), as well as energy, the number of zero crossings, spectral entropy, and relative power between different frequency bands. The classifier is applied to each frame, producing a sequence of class labels. These labels are then smoothed using a dynamic programming cost minimization algorithm, similar to those used in hidden Markov models.

In addition to audio features, features may be extracted from the words or phrases spoken by narrators and/or announcers. From a domain specific ontology 257, a predetermined list of words and phrases is selected and the speech stream is monitored for the utterance of such terms. A feature vector representation is created in which the value of each element represents the number of times a specific word from the list was uttered. The presence of such terms in the feature vector correlates with the occurrence of an event associated with the predetermined list of words. For example, the uttering of the phrase "touchdown" is correlated with the occurrence of a touchdown in sports video.

Unlike image and audio features, camera motion features represent more precise information about the actions occurring in a video. The camera acts as a stand in for a viewer's focus. As actions occur in a video, the camera moves to follow it; this camera motion thus mirrors the actions themselves, providing informative features for event identification. Like shot boundary detection, there are various methods for detecting the motion of the camera in a video (i.e., the amount it pans left to right, tilts up and down, and zooms in and out). One exemplary system is described in Bouthemy, P., et al., *A unified approach to shot change detection and camera motion characterization*, IEEE Trans. on Circuits and Systems for Video Technology, 9(7) (October 1999); this system computes the camera motion using the parameters of a two-dimensional affine model to fit every pair of sequential frames in a video. According to one embodiment, a 15-state first-order hidden Markov model is used, implemented with the Graphical Modeling Toolkit, and then the output of the Bouthemy is output into a stream of clustered characteristic camera motions (e.g., state 12 clusters together motions of zooming in fast while panning slightly left). Some domains may use different, or additional, methods of identifying events. For example, in American football, an additional factor may be scene classification. In scene classification, once a shot boundary is detected a scene classifier is used to determine whether that shot is primarily focused on a particular scene, e.g., a playing field. Individual frames (called key frames) are selected from within the shot boundaries and represented as a vector of low level features that describe the key frame's color distribution, entropy, motion, etc. A shot is determined to be of a particular scene if a majority of the sampled frames is classified as that scene.

Event Boundary Determination

Once a segment of video is determined to contain the occurrence of an event, the beginning and ending boundaries of that event must be determined 430. In some cases, the shot boundaries determined in 410 are estimates of the beginning and end of an event. The estimates can be improved as well by exploiting additional features of the video and audio streams to further refine the boundaries of video segments. Event boundary determination 430 may be performed using a classifier that may be optimized by hand or using supervised learning techniques. The classifier may make decisions based on a set of rules applied to a feature vector representation of the data. The features used to represent video overlap with those used in the previous processes. Events have beginning and end points (or offsets), and those boundaries may be determined based on the presence/absence of black frames, shot boundaries, aspect ratio changes, etc., and have a confidence measure associated with the segmentation. The result of event boundary determination 430 (concluding video event segmentation 410) is a (set of) segmented video event 435 that is stored in the video event store 280.

Video Metadata Alignment/Annotation

Figure 5:
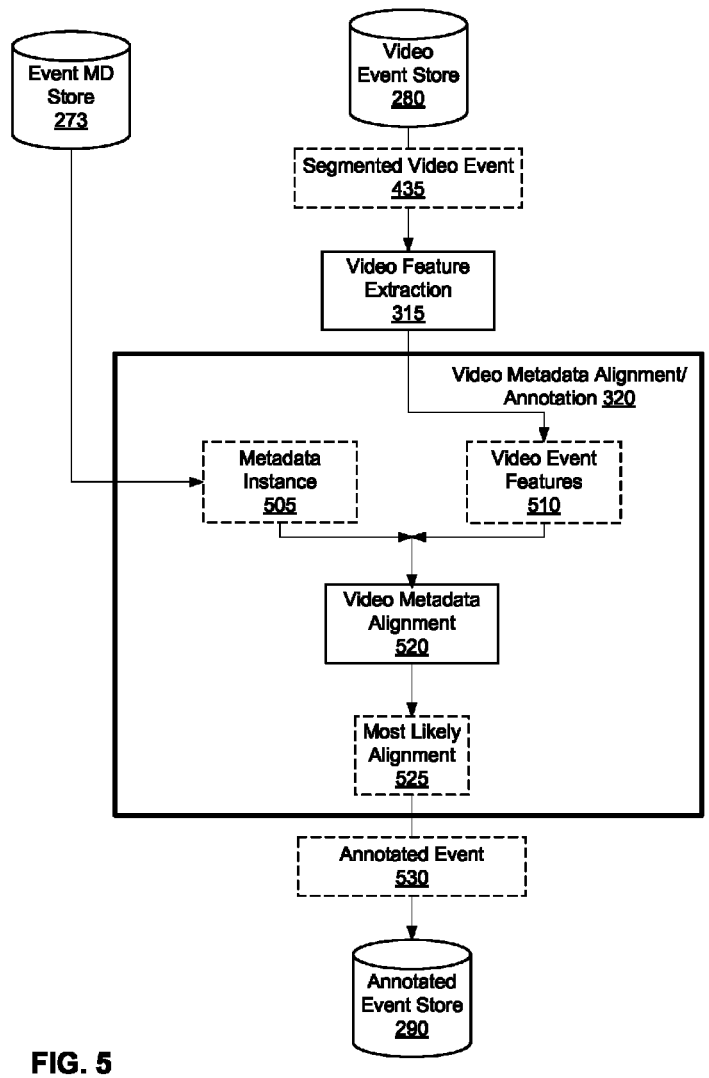
FIG. 5 is a flow diagram illustrating one embodiment of a metadata alignment/annotation process.

FIG. 5 is a flow diagram illustrating one embodiment of a metadata alignment/annotation 320 process. As described in FIG. 3A, the metadata alignment/annotation 320 process produces annotations of the segments from video event segmentation 310, which annotations include semantically meaningful information regarding the event or topic that the segment is about. Metadata alignment/annotation 320 includes two steps: event feature extraction 315 and video metadata alignment 520.

Video Feature Extraction

For any given video event that is to be aligned with metadata, the first step is to convert the video event into a feature vector representation via feature extraction 315. The feature extraction engine 225 is one means for performing this function. Input to the process is a segmented video event 435 retrieved from the video event store 280. Output from the video feature extraction 315 is a video event feature representation 510. The features may be identical to (or a subset of) the image/audio properties discussed above for video events and stored in the event metadata store 273, and may vary by domain.

Video Metadata Alignment

Video metadata alignment 520 takes as input the feature vector representation 510 of an event and a metadata instance 505, defined above as metadata corresponding to a single event. The metadata alignment engine 230 is one means for performing this function. It cycles through each metadata instance 505 in the event metadata store 273 and uses an alignment function to estimate the likelihood that a particular event may be described by a particular metadata instance for an event. As described above, metadata instances may include automatic annotations of low level content features (e.g., image or audio features), hand annotations of text descriptions, or both. For domains in which the metadata includes low level features, the alignment function may be a simple cosign similarity function that compares the feature representation 510 of the event to the low level properties described in the metadata instance 505. For domains in which metadata instances do not include automatic annotations of low level features, the video metadata alignment 520 method may employ a model which encodes relationships between low level features and descriptive text. One exemplary model is described in Fleischman, M. and Roy, D., *Grounded Language Modeling for Automatic Speech Recognition of Sports Video*, Proceedings of the Association of Computational Linguistics (ACL), Columbus, Ohio, pp. 121-129 (June 2008). This method uses grounded language models that link visual and text features extracted from a video to the metadata terms used to describe an event. For the purposes of this example, grounded language models can be manually estimated based on the visual and text features used for event segmentation, from which the following equation describes the likelihood that any particular metadata annotation describes a particular video event:

$$p(\text{metadata}|Vid) = \prod_{w \in \text{metadata}} \sum_{v \in Vid} p(w|v)$$

The grounded language model is used to calculate the probability that each video event found is associated with each human generated metadata annotation.

When all metadata instances 505 in the event metadata store 273 corresponding to the event have been examined, if the most likely alignment 525 (i.e., alignment with the highest probability or score) passes a threshold, the video event associated with the feature representation 510 is annotated with the metadata instance 505 and the resulting annotated event 530 is stored in an annotated event store 290 along with a score describing the confidence of the annotation. If no event passes the threshold, the event is marked as not annotated. In order to set this threshold, a set of results from the process is hand annotated into two categories: correct and incorrect results. Cross-validation may then be used to find the threshold that maximizes the precision/recall of the system over the manually annotated result set.

Social Media/Event Alignment

Figure 6:
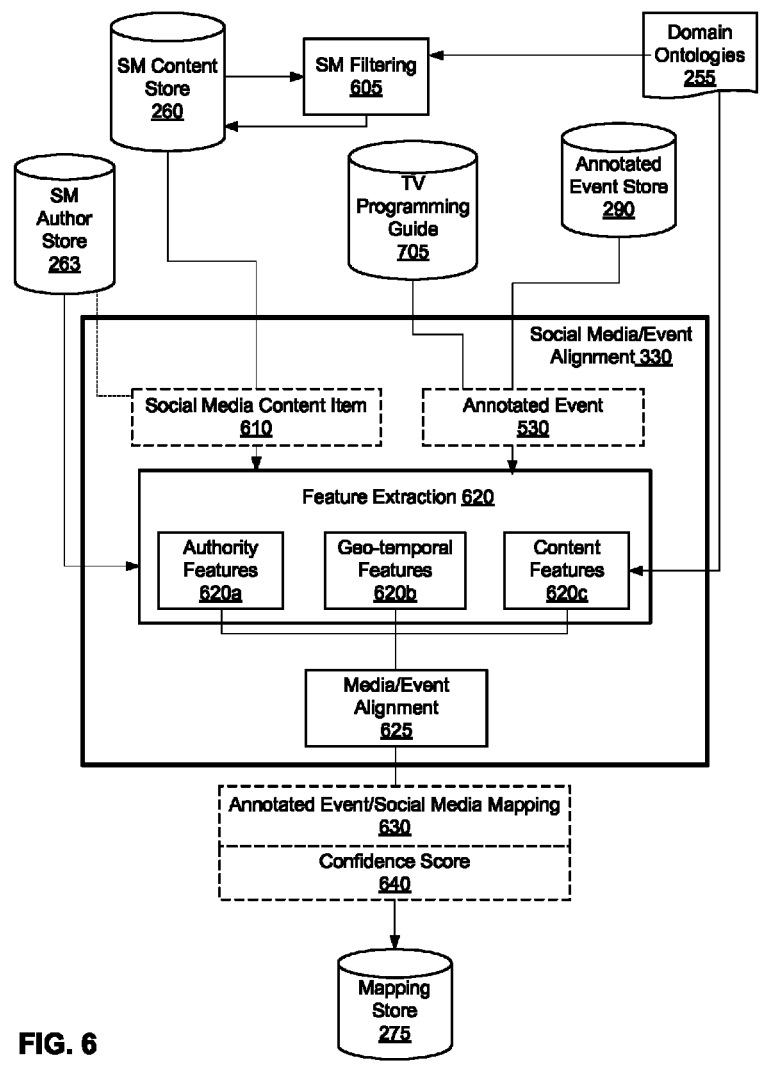
FIG. 6 is a flow diagram illustrating one embodiment of a social media/event alignment process.

FIG. 6 is a flow diagram illustrating one embodiment of a social media/event alignment 330 process. Social media/event alignment 330 associates (maps) the annotated time-based media event segments with social media content items and references to the events therein.

Filtering

As an initial and optional step, social media filtering step 605 occurs; the domain ontologies 257 are one means for performing this function. Social media content items are filtered in order to create a set of candidate content items with a high likelihood that they are relevant to a specific event. Content items can be relevant to an event by including a reference to the event.

In this optional step, before social media content items are integrated with video events, a candidate set of content items is compiled based on the likelihood that those posts are relevant to the events, for example, by including at least one reference to a specific event. The comparative feature extraction engine 240 is one means for performing this function. At the simplest, this candidate set of content items can be the result of filtering 605 associated with a given time frame of the event in question. Temporal filters often are far too general, as many content items will only coincidentally co-occur in time with a given event. In addition, for broadcast television, e.g., the increasing use of digital video recorders has broadened significantly the relevant timeframe for events.

Additional filters 605 are applied based on terms used in the content item's text content (e.g., actual texts or extracted text from closed caption or audio) that also appear in the metadata for an event and/or domain specific terms in the ontologies 257. For example, content item of a social network posting of "Touchdown Brady! Go Patriots" has a high probability that it refers to an event in a Patriots football game due to the use of the player name, team name, and play name, and this content item would be relevant to the event. In another example, a content item of a post that "I love that Walmart commercial" has a high probability that it refers to an advertisement event for Walmart due to the use of the store name, and the term "commercial," and thus would likewise be relevant to this event. To perform this type of filtering, terms are used from the metadata of an event as well as those domain-specific terms stored in ontology 257.

A social media content item can be relevant to an event without necessarily including a direct textual reference to the event. Various information retrieval and scoring methods can be applied to the content items to determine relevancy, based on set-theoretic (e.g., Boolean search), algebraic (e.g., vector space models, neural networks, latent semantic analysis), or probabilistic models (e.g., binary independence, or language models), and the like.

Social media content items that do not pass certain of these initial filters, e.g., temporal or content filters, are removed from further processing, reducing the number of mappings that occur in the latter steps. The output of social media filtering 605 is an updated social media content store 260, which indicates, for each content item, whether that content item was filtered by temporal or content filters. Additional filters may apply in additional domains.

Media/Event Alignment

Social media/annotated event alignment 330 includes a feature extraction process 620 and an alignment function 625. The feature extraction process 620 converts input of an annotated event 530 and a social media content item 610 into a feature vector representation, which is then input to the alignment function 625. The feature extraction process 620 also may receive input from the social media author store 263 and the domain ontologies 257. The three major types of features extracted in this process 620 are content features 620c, geo-temporal features 620b, and authority features 620a. The comparative feature extraction engine 240 is one means for performing this function, which identifies a relationship between the event features and social media features. The relationship may be co-occurrence, correlation, or other relationships as described herein.

Content features 620c refer to co-occurring information within the content of the social media content items and the metadata for the video events, e.g., terms that exist both in the content item and in the metadata for the video event. Domain ontologies 257 may be used to expand the set of terms used when generating content features.

Geo-temporal features 620b refer to the difference in location and time at which the input media was generated from a location associated with the social media content item about the event. Such information is useful as the relevance of social media to an event is often inversely correlated with the distance from the event (in time and space) that the media was produced. In other words, social media relevant to an event is often produced during or soon after that event, and sometimes by people at or near the event (e.g., a sporting event) or exposed to it (e.g., within broadcast area for television-based event).

For video events, geo-temporal information can be determined based on the location and/or time zone of the event or broadcast of the event, the time it started, the offset in the video that the start of the event is determined, the channel on which it was broadcast. For social media, geo-temporal information can be part of the content of the media itself (e.g., a time stamp on a blog entry or status update) or as metadata of the media or its author.

The temporal features describe the difference in time between when the social media content item was created from the time that the event itself took place. In general, smaller differences in time of production are indicative of more confident alignments. Such differences can be passed through a sigmoid function such that as the difference in time increases, the probability of alignment decreases, but plateaus at a certain point. The parameters of this function may be tuned based on an annotated verification data set. The spatial features describe the distance from the author of the content item location relative to the geographical area of the event or broadcast. Spatial differences are less indicative because often times people comment on events that take place far from their location. A sigmoid function may be used to model this relationship as well, although parameters are tuned based on different held out data.

Authority features 620a describe information related to the author of the social media and help to increase the confidence that a social media content item refers to a video event. The probability that any ambiguous post refers to a particular event is dependent upon the prior probability that the author would post about a similar type of event (e.g., a basketball game for an author who has posted content about prior basketball games). The prior probability can be approximated based on a number of features including: the author's self-generated user profile (e.g., mentions of a brand, team, etc.), the author's previous content items (e.g., about similar or related events), and the author's friends (e.g., their content contributions, profiles, etc.). These prior probability features may be used as features for the mapping function.

The alignment function 625 takes the set of extracted features 620a-c and outputs a mapping 630 and a confidence score 640 representing the confidence that the social media content item refers to the video event. The media/event alignment engine 245 is one means for performing this function. For each feature type 620a-c, a feature specific sub-function generates a score indicating whether the social media content item refers to the annotated event. Each sub-function's score is based only on the information extracted in that particular feature set. The scores for each sub-function may then be combined using a weighted sum, in order to output a mapping 630 and an associated confidence score 640, as shown below for an event x and a social media content item y:

$$\text{align}(\text{feat}(x,y)) = [\alpha \cdot \text{content}(\text{feat}(x,y))] + [\beta \cdot \text{geoTemp}(\text{feat}(x,y))] + [\gamma \cdot \text{author}(\text{feat}(x,y))]$$

where $\alpha$, $\beta$, and $\gamma$ are the respective weights applied to the three feature types, and align(feat(x,y)) is the confidence score. Both the weights in the weighted sum, as well as the sub-functions themselves may be trained using supervised learning methods, or optimized by hand. The output of the social media/event alignment function 330 is a mapping between an annotated event and a social media content item. This mapping, along with the real-value confidence score is stored in the mapping store 275.

Example

American Football

As described in conjunction with FIG. 3A, multiples streams of data are ingested as a preliminary step in the method. For the football domain, in addition to the data discussed in FIG. 3, an additional source of data comes from statistical feeds that contain detailed metadata about events (with text descriptions of those events) in a football game. Statistical feed are available from multiple sources such as the NFL's Game Statistics and Information System and private companies such as Stats, Inc.

Video Event Segmentation

In the video event segmentation 310 process for American football, the time-based media, e.g., a broadcast television feed for a football game, is segmented into semantically meaningful segments corresponding to discrete "events" that include plays in a game (and advertisements in between).

The first step in segmenting events in a football video is to detect the shot boundaries of a video. Shot boundaries are points in a video of non-continuity, often associated with the changing of a camera angle or a scene. In the domain of American football, changes in camera angles are typically indicative of changes in plays.

In the football domain, event detection 420 may operate by first identifying shots that depict the football field. Once a shot boundary is detected, a scene classifier is be used to determine whether that shot is primarily focused on the playing field. Field shots may then be further classified as depicting a game event (i.e. a play). In the football domain, during event boundary determination 430 the beginning and end points (i.e., in/out points) of an event may be refined to reflect more appropriate start and stop points of a play. Such in/out points may be adjusted based on clock characterization, and/or utterance segmentation. In a professional football game, the beginning and end of a play is sometimes (but not always) associated with the starting or stopping of the play clock. This play clock is often shown as a graphic overlay in a broadcast football game. The starting/stopping of this play clock can be determined by monitoring the amount of change (in pixels) of a frame sub-region (i.e., the region containing the play clock graphic) in the video over time. When the aggregate change in such sub-regions falls below a threshold for greater than one second, the state of the play-clock is assumed to be "inactive." If the aggregate change goes above a threshold, the state of the play-clock is assumed to be "active." Changes in the state of the play-clock are strong indicators that an event has either begun or ended in the video.

Aesthetic judgment is often required when determining boundaries for the precise start and end points of a play. Approximating such judgments can be accomplished using the utterance boundaries in the speech of the game announcers. These utterances boundaries can be detected by identifying pauses in the stream of speech in the video. Pauses can be identified using audio processing software, such as is found in Sphinx 3.

Thus, the output of video event segmentation 310 for an American football game on broadcast television is a set of segmented video events corresponding to plays in a game.

Video Metadata Alignment/Annotation

The process of metadata alignment/annotation 320 in American football operates on the video stream segmented into events based on plays in the game. These events are annotated with metadata concerning the type of event shown (e.g. "touchdown"), key players in those events (e.g. "Tom Brady"), the roles of those players (e.g. "Passer"), and, details of the event (e.g. "number of yards gained"). This metadata can be added manually by human experts, fully automatically by a machine algorithm, or semi-automatically using a human-machine hybrid approach. Metadata is stored in the event metadata store 273.

For each event (i.e., play) that is to be aligned with metadata, the play is converted into a feature vector representation via feature extraction 315. Video metadata alignment 520 then takes as input the feature vector representation 510 of a single play and a metadata instance 505. It cycles through each metadata instance 505 in the event metadata store 273 and estimates the likelihood that the particular play may be described by a particular metadata instance using, for example, a probabilistic model. One exemplary model is the grounded language model described above.

Social Media/Event Alignment

In social media/annotated event alignment 330, feature extraction 620 generates geo-temporal features, content features, and authority features. Content feature representations express the amount of correlated content between event metadata and terms within social media content items. For example, the content item "Touchdown Brady! Go Patriots," and the annotation "passer: Brady, event: touchdown, receiver: Moss" have overlapping content terms (i.e., "touchdown" and "Brady").

In addition to exact matches, the domain ontology 257 of football terms is used to expand the term set to include synonyms and hypernyms (e.g., "TD" or "score" for "touchdown"), as well as nicknames for players (e.g. "Tom Terrific" for "Brady").

Authority feature representations express the prior probability that any author of social media content may be referring to a football event. One factor in the estimation of this probability may be based on the friends, followers, or other connections to a user in their social network. Such connections are indicative of an author's likelihood to post about a football event, which can provide additional features for the social media/event alignment 330 function. The more friends someone keeps who post about football events, the more likely they will post about football events. To capture this information, meta-scores are generated for a user based on the frequency that their contacts have posted about football events. The meta-scores are the average, mode, and median of all of the frequency of their friends' football posts.

The output of social media/event alignment 330 is a mapping between the annotated play and each social media content item, with an associated confidence score.

Example

Advertising

As described in conjunction with FIG. 3A, multiples streams of data are ingested as a preliminary step in the method.

Video Event Segmentation

For the advertising domain, during the video event segmentation 310 process, the time-based media is segmented into semantically meaningful segments corresponding to discrete "events" which are identified with advertisements (i.e. commercials).

Event detection 420 in the advertising domain may operate by identifying one or more shots that may be part of an advertising block (i.e. a sequence of commercials within or between shows). Advertising blocks are detected using image features such as the presence of all black frames, graphics detection (e.g. presence of a channel logo in the frame), aspect ratio, shot boundaries. Speech/audio features may be used including detection of volume change, and the presence/absence of closed captioning.

Event boundary detection 430 operates on an advertisement block and identifies the beginning and ending boundaries of individual ads within the block. Event boundary determination may be performed using a classifier based on features such as the presence/absence of black frames, shot boundaries, aspect ratio changes. Classifiers may be optimized by hand or using machine learning techniques.

Video Metadata Alignment/Annotation

As with event segmentation 310, the video metadata alignment/annotation 320 process is domain dependent. In the advertisement domain, metadata for an advertisement may include information such as "Brand: Walmart, Scene: father dresses up as clown, Mood: comic." This metadata is generated by human annotators who watch sample ad events and log metadata for ads, including, the key products/brands involved in the ad, the mood of the ad, the story/creative aspects of the ad, the actors/celebrities in the ad, etc.

Metadata for advertisements may also include low level image and audio properties of the ad (e.g. number and length of shots, average color histograms of each shot, power levels of the audio, etc.).

For each event (i.e., advertisement) that is to be aligned with metadata, the advertisement is converted into a feature vector representation via feature extraction 315. Video metadata alignment 520 then takes as input the feature vector representation 510 of a single advertisement and a metadata instance 505. It cycles through each metadata instance 505 in the event metadata store 273 and estimates the likelihood that the particular advertisement may be described by a particular metadata instance using, for example, a simple cosign similarity function that compares the low level feature representation of the ad event to the low level properties in the metadata.

The particular start and end times, channel and location in which the specific advertisement appeared is included with the metadata that is stored in the Annotated Event Store 290.

Social Media/Event Alignment

Generally, social media/event alignment 330 generates geo-temporal features, content features, and authority features. Content feature representations express the amount of co-occurring content between television show or advertisement metadata, as stored in the TV programming guide 705 and annotated event store 290, and terms within social media content items. For example, the content item "I loved this Glee episode. Can you believe what Quinn just did" and the metadata for the television show "Glee": {"Show: Glee; Cast: Dianne Agron, Chris Colfer, etc.; Characters: Quinn, Kurt, etc.; Description: In this episode . . . "} have co-occurring (i.e., matching) content terms (i.e., "Glee" and "Quinn"). In another example, the content item "I loved that hilarious Walmart clown commercial" and the metadata for an advertisement for Walmart { "Brand: Walmart, Scene: father dresses up as clown, Mood: comic"} have co-occurring content terms (i.e., "Walmart" and "clown"). The matches may be considered generally, so that content appearing anywhere in a social media message can be matched against any terms or elements of the television show or advertisement metadata, or may be restricted to certain sub-parts thereof.

In addition to exact matches, the domain ontologies 257 that encode information relevant the television show and/or advertising domain may be used to expand the term set to include synonyms and hypernyms (e.g., "hilarious" for "comic"), names of companies, products, stores, etc., as well as TV show associated words (e.g., "episode") and advertisement associated words (e.g., "commercial").

The output of social media/event alignment 330 is a mapping between the annotated TV show or advertisement and each social media content item, with an associated confidence score. This information is stored in the mapping store 275.

Cross Media Targeted Message Synchronization

Figure 7:
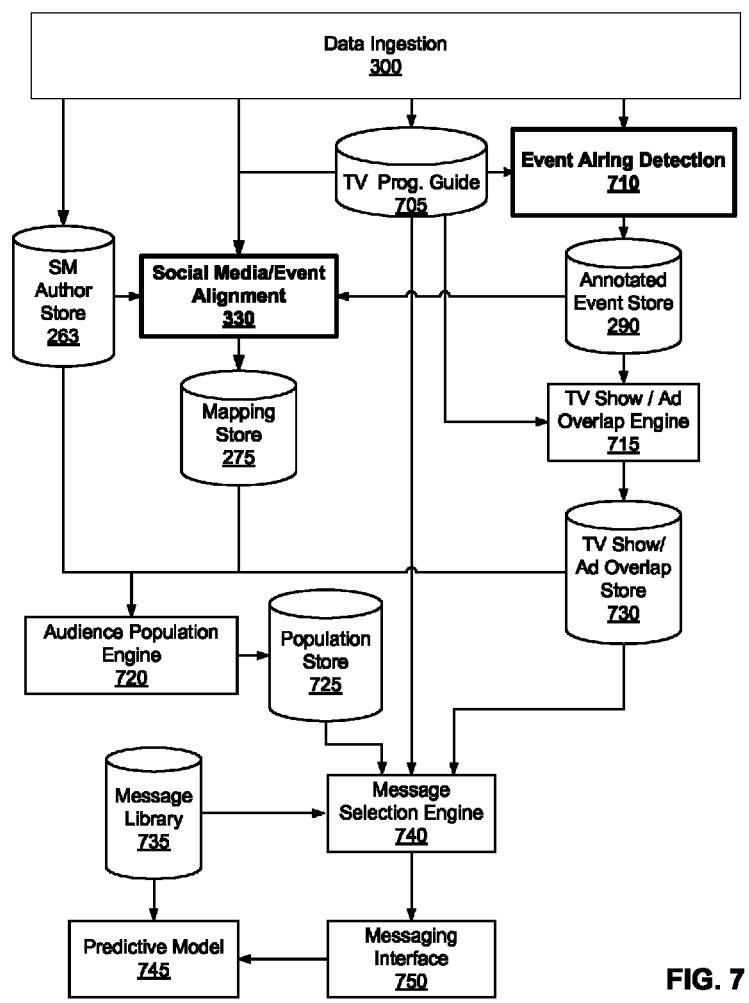
FIG. 7 is a flow diagram illustrating one embodiment of cross media targeted message synchronization, according to one embodiment.

FIG. 7 is a flow diagram illustrating one embodiment of cross media targeted message synchronization, according to one embodiment. Cross media targeted message synchronization sends social media messages to specific populations of authors of social media content items who have written about specific television shows or advertisements. Cross media targeted synchronized messaging assumes that a social media user who authors a comment on a TV show or advertisement has also been exposed to the specific advertisements that are shown during a referenced TV show or near in time to a referenced advertisement. As advertisers use the audience demographics of TV shows to select TV shows in which to show advertisements, cross media targeted message synchronization allows advertisers to leverage their investments in advertisements with messaging to authors who are most likely to be in a particular demographic of interest to the advertiser, and who are most likely to have viewed their advertisements.

The cross media targeted message synchronization engine 700 is one mechanism for performing this function. In cross media targeted message synchronization, the data ingest process 300 receives data from a number of different data feeds including social media content items, metadata for social media content items (including, for example, the authors of those items), TV video streams, and TV electronic programming guide data ("EPG data").

The EPG data received from data ingestion 300 is stored in a TV programming guide 705. The EPG data includes metadata as to where (e.g., channel, geographic region) and when specific TV shows are shown. The EPG data also includes metadata regarding the content of those shows (e.g. cast, characters, episode descriptions, etc.). The EPG data is stored in the TV pgramming guide 705 as a set of mappings between TV programming information (e.g. TV show names, casts, characters, genres, etc.) and specific airing information (e.g. time, channel, network, region, etc.). EPG data can be obtained from broadcast and cable networks, multiple system operators, or third party services. In one embodiment, the EPG data is received as part of event airing detection 710, rather than separately (not shown).

The received TV streams are processed using event airing detection 710 in order to identify airings of specific advertisement in the TV streams. Data ingestion 300 receives the TV streams from network broadcast, cable, internet, or satellite providers. The output of event airing detection 710 is stored in the annotated event store 290 as a set of mappings between video events (e.g., advertisements and TV shows) and metadata annotations (e.g., showing time, channel, brand, keywords, etc.) associated with those video events.

Event airing detection 710 is described generally above with respect to FIG. 3A. Event airing detection 710 incorporates video event segmentation 310, which is described in FIG. 4, as well as video metadata alignment/annotation 320, which is described in FIG. 5. A specific example of ad airing discovery 710 is described above under the heading "Example: Advertising".

The EPG data stored in the TV programming guide 705 is similar to the event metadata stored in the annotated event store 290. Each type of data contains mappings of video events to metadata regarding those events. The difference between the two is that event metadata is determined by processing raw video streams whereas EPG data as received is already in a metadata format. The two different types of data may be complementary, in that both are used to obtain some information not known by the other. Alternatively, in other embodiments, the cross media targeted message synchronization engine 700 may use either EPG data or event metadata in order to send cross media targeted messages.

EPG data may also be used as an input to the event airing detection 710. In this case, the process of video event segmentation 310 is simplified due to the information already known in the EPG data. In this case, video event segmentation 310 maps the segmented video events created by video event segmentation 310 to the time and channel when those events are shown as provided by EPG data. The video events 280 are stored in the video event store 280 with the time shown information.

Author information received by data ingestion 300 is stored in the SM author store 263. The author information may include author profile information, demographic information, social graph information, and the history of the content items the author has produced. Author profile information may include, for example, user contact information such as a user name in a social network, a mobile number, an email address, or the like.

Social media content items received from data ingestion 300 are processed using social media/event alignment 330. Social media/event alignment 330 is described above with respect to FIG. 6. Social media/event alignment 330 takes as input the author information from the SM author store 263, EPG data from the TV programming guide 705, and advertisement information from the annotated event store 290. Social media/event alignment 330 aligns social media content items to the TV shows and advertisements that those content items refer to or are otherwise associated with. The mapped relationships between the content items and TV shows/advertisements are stored in mapping store 275.

The TV show/ad overlap engine 715 uses EPG data from the TV Programming Guide 705 and the annotated video events from the annotated event store 290 to create mappings between detected advertisement airings and the specific TV shows in which those airings occurred. The mappings are determined by taking the airing information from the EPG data and matching it against the airing information of advertisements stored in the annotated event store 290. The matching may include, for example, comparing the temporal extent of the airing times of the TV shows and advertisements. If an advertisement airs between the total temporal extent of the TV show, the airing advertisement is determined to match (or overlap) the airing of the TV show. When an airing of an advertisement occurs on the same channel, in the same TV market, and within the same airing time window as a TV show, a mapping indicative of this occurrence is stored in the TV show/ad overlap store 730 by the TV show/ad overlap engine 715. For example, a mapping may be created between an ad for laundry detergent airing at 7:15 pm PST on FOX™ on Comcast™ cable and an episode of the TV show Glee from 7:00 pm to 8:00 pm PST, also on FOX™ on Comcast™ cable.

The audience population engine 720 combines metadata associated with social media content items that refer to specific TV shows and advertisements (from the mapping store 275), with information about the authors of those content items (from the SM author store 263) to output a mapping of TV shows and advertisements to populations of authors who are targeted to receive messages from the cross media targeted message synchronization engine 700. These populations are stored in the population store 725. In order to determine the mappings, authors may be identified both directly (e.g., by lists of user IDs or other identifying information) or parametrically (e.g., by demographic attributes, exposure to TV shows or ads, content of items authored, or timing) or by a combination thereof. A given TV show or advertisement may be associated with multiple, overlapping populations of authors.

The audience population engine 720 creates populations of authors by filtering the list of available authors based on author specific information as well as the metadata from the content items those authors have created. Various sub-populations of authors generated by the audience population engine 720 are stored in the population store 725. Once created, populations may later be refined or generalized from the original population using other filters. The filters available to create populations include demographic, content, temporal, or exposure filtering. Collectively, filtering (including generalizing as well as refining), may be referred to as audience filtering. Sub or super populations generated based on an original population are equivalent to any other population of authors. The ability to tailor the populations of authors facilitates use of the cross media targeted message synchronization system 700 by advertisers or third parties who wish to narrow or widen the scope of their targeted advertising activities.

As to demographic filtering, examples include filtering authors based their on age, gender, socioeconomic data, genre interests, hobbies, or location. Demographic filtering can also be performed based on an author's affiliations within social media or social networking systems. In addition, messages can be sent to authors based on their membership in particular groups, or networks.

As to content filtering, authors can be filtering based on whether the content items they have created match particular content filters, such as use of particular keywords or phrases. For example, the filter may be set to include authors whose content items contain the name "Jane", as in "Did you see Jane's outfit!!" Filters may also be set to include authors who mention particular products or items. For example, filters may include authors who use the words "outfit" or "dress" or "wearing", such as "I love what Brenda was wearing!". Filters may also be set to include authors based on their sentiment towards products, in order to, for example, only target users who express positive sentiment toward those products. For example, a filter may be set to include authors referring to a "dress" in positive contexts only, such as "I love that dress," and not authors who use them in negative contexts, such as "I hate that dress."

As to temporal filtering, filters can be used to create subpopulations of authors who created (posted) their message within a certain period of time before (or after) an advertisement appears (e.g., 60 seconds). Temporal filtering may also be used to remove authors who have recently received a cross media targeted synchronized message, either from the same advertiser or from any advertiser (e.g., within the last hour).

A super-population may be generated by broadening the original rules or filters used to create the original population. The broadening may result in including authors in the superpopulation who created social media content items for video events that are related to the video event used to form the initial population. For example, instead of targeting all social media authors who have commented on a particular episode of Glee, the target population could be broadened to include all social media authors who have ever commented on any episode Glee. The reasoning behind targeting the more general population of Glee viewers for messaging is that social media authors who are engaged enough to comment on a particular episode of a TV show are likely to be watching that show on future occasions, even if they do not author a social media content item for every episode.

As to exposure filtering, the audience population engine 720 can create an exposed population (or exposed audience) of authors who have authored content items on TV shows in which a given ad has aired in. The exposed population is determined to have been "exposed" in the sense that there is expected to be a high likelihood that an author of a social content item that references a particular TV show has seen (or been exposed to) the advertisements that aired during that television show. Exposure filtering uses the TV show/ad overlap information from the TV show/ad overlap store 730 in order to determine which advertisements aired during which television shows. Exposure filtering uses the overlap information in conjunction with author information from the SM author store 263 and metadata regarding the alignment between content items and TV shows to determine which authors have been exposed to which advertisements. Exposed populations of authors are stored in the populations store 725, along with all other populations.

Message library 735 is a data store that stores message content (i.e., advertising creatives) to be sent to various target populations. Message library 735 also stores metadata associated with each message. Message metadata may include advertiser, geographic or usage restrictions, and message sequencing information. Message library 735 also stores rules for when, and to whom, messages are to be sent. The content of a message may include offers, incentives, and product information. For example, a message may take the form of a hyperlink stating "Click here for an additional 10% off jeans already on sale at Old Navy™," along with an underlying URL. Messages may also be sent as SMS messages with offers such as "Text SALE NOW to 123456."

Rules for messages may take the form of a mapping between a combination of any one of a particular advertisement a particular TV show, a particular message to be sent, a particular targeted population of authors, and a particular time the message is to be sent. For example, a rule may embody the logic of "If advertisement X airs during show Y, then send message N to the Audience M." As some advertisers show the same advertisement multiple times during a TV show, the rules can also more precisely identify a time (or time window) at which an advertisement aired, or the advertisement's sequence position (e.g., first appearance, second appearance, etc.,). Sequence position is useful where the advertiser does not know in advance exactly when its advertisements may appear, and to overcome variations in program scheduling. The populations of authors who receive a message can be adjusted using audience filters as described above. Audience filters may be implemented rule antecedents or rule consequents that select different populations of authors stored in the population store 725. Rules may also specify when a message is to be sent. For example, a rule may specify that a message is to be sent while the advertisement is airing, within a specific time period after the advertisement airs, the next time the recipient logs into a social networking system, the next time the user authors a content item on the relevant television show or advertisement, or that the message may be sent at anytime in the future.

Message selection engine 740 keeps track of the TV shows that are currently airing, as well as the advertisements that are airing or have just aired. The message selection engine 740 may do this by monitoring information from the TV programming guide 705 and/or the TV show/ad overlap store 730. When advertisements are detected, the message selection engine 740 queries the message library 735 for rules associated with the airing of the detected advertisements with respect to the TV shows they are aired in. If such a rule is matched, the message selection engine 740 identifies a message associated with the matched rule, as well as a population of author from the population store 725 who are to be messaged according to the matched rule.

As different social media content authors may have different types of contact information, the message selection engine 740 is configured to determine, for each author, the appropriate messaging mechanism. Examples of types of message communication include, for example, text message via SMS, email, message posted on a user's profile page on a social network, or the like. This information may be obtained from the SM author store 263.

A messaging interface 750 communicates the message to the targeted population. The messaging interface 750 is a process that hooks into the application programming interfaces (APIs) of various social media networks and other communications networks (e.g., SMS system, internet, email) and sends the selected message to the targeted authors within those networks as identified by the message selection engine 740. In one embodiment, the message selection engine 740 instructs the messaging interface 750 to send a message while the advertisement that generated the message is airing. Alternatively the message selection engine 740 instructs the messaging interface 750 to send the message within a limited period after the advertisement airs (e.g., within 5 minutes). The time period may be specified by the advertiser as part of the message metadata. For example, an advertiser may specify that message must be delivered within 30 seconds of the advertisement airing. Alternatively, the advertiser may specify that that a sequence of messages is be transmitted over a designated time period.

The messaging interface 750 is also configured to collect response data from authors in order to monitor whether the messages were received and acted upon. This collected information is used in a predictive model 745 to refine the rules used to determine how messages are sent to authors. For example, the predictive model 745 may be used to adjust the selection of messages sent to authors, the content of messages selected to be sent to authors, the audience targeted for particular messages, the timing of when messages are sent to authors, and the mappings between messages and particular advertisements and TV shows. The predictive model 745 may use machine learning to train which messages to send. For example, the predictive model 745 may be trained using positive and negative examples of click-throughs by the recipient of a message to refine what messages are sent when and to which authors, in order to improve the click through rate of sent messages.

Response data may include determining whether a user clicks on a link included in a message. Response data may also include the characteristics of a message (e.g., particular wording, types of offers), information about the author receiving the message (e.g., demographics, substance of authored social media content items), and the TV source stream that triggered the message (e.g., which particular TV shows and associated metadata). Response data may also "non-response data", or information about messages that authors did not respond to. Monitoring the differences between messages that are responded to versus those that are not responded to allows the predictive model 745 to tailor targeted messaging to obtain a greater response rate from authors receiving the targeted messages.

Example

Old Navy™ Targeted Messaging

Old Navy™ is a retail clothing company who advertises on TV and who may want to offer coupons to certain users. Conventionally, Old Navy™ could use a direct mail marketing campaign to send coupons to individuals selected from qualified mailing lists (such as prior purchasers of their products), or simply allow users to download coupons from a website. Neither of these approaches directly leverage the advertising expenditures that the company has made for TV advertisements.

In one embodiment, Old Navy™ can send coupons as targeted messages directly to authors of social media content items related to TV shows in which Old Navy's advertisements appear. Old Navy™ can send targeted messages to authors of content items related to the advertisement itself. The targeted messages may include coupons offering discounts to the authors if they click on a URL contained in the message.

In one embodiment, one or more TV streams is monitored for airings of specific Old Navy™ advertisements. At some point during one of the TV streams, an Old Navy™ commercial advertising a sale on jeans is detected using event airing detection 710. The TV show/ad overlap engine 715 uses the current time and stream information (e.g., channel, media market) to determine which TV show was being aired on that stream when the advertisement aired. For example, it may be determined that the Old Navy™ advertisement was aired during an episode of the show Glee.

Having detected this occurrence of the Old Navy™ advertisement, social media authors who have commented on the episode of Glee (or the Old Navy™ ad, itself) are determined by event airing detection 710 and social media/event alignment 330. These authors are aggregated into a population using one or more filters by the audience population engine 720. The population is sent a social media message by the message selection engine 740 in conjunction with the messaging interface 750. In one embodiment, the message includes a link to an offer (e.g., a coupon, discount or other incentive). For example, the authors may receive the message: "Click here for an additional 10% off jeans already on sale at Old Navy™."

Messages may also be more specifically targeted to the TV show in which the ad aired. For example, when an Old Navy™ ad airs during Glee, the following message may be sent to the target author population: "Glee fans: click here for a Glee trivia quiz. You could win an additional 10% off jeans already on sale at Old Navy™." In another example, when an Old Navy™ advertisement airs during the TV show Glee, the following message may be sent to social media authors who are classified as female, age 18-24: "Click here for an additional 10% off skirts already on sale at Old Navy™."

Additional Considerations

Although American football and advertising domains are described above, the methods described herein can be adapted to any domain using time-based media. The method of adaptation is general across different domains and focuses on two changes. First, techniques and features used for event segmentation and annotation are adapted to reflect domain specific characteristics. For example, detecting events in football exploits the visibility of grass as it is represented in the color distributions in a video frame, while detecting events in news video may exploit clues in the closed captioning stream and graphic overlays in the frames. The second change involves the ontology used to link events to social media content items which refer to them. While for football, the requisite ontology contains concepts related to football players, teams, and events, domains such as news video require ontologies with concepts related to germane concepts such as current events and culturally popular figures.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules or engines, without loss of generality. The described operations and their associated modules or engines may be embodied in software, firmware, hardware, or any combinations thereof.

Any of the steps, operations, or processes described herein may be performed or implemented with one or more hardware or software modules or engines, alone or in combination with other devices. In one embodiment, a software module or engine is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be persistently stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-executed method for sending messages to authors of social media content items, comprising:
  identifying a plurality of candidate social media content items broadcasted by a social media source;
  identifying a plurality of media events from a time-based media source, the time-based media source independent from the social media source, and the media events including a television media event and an advertisement media event;
  for each of the candidate social media content items, determining, using a computer processor, a confidence score indicative of a probability that the candidate social media content item is relevant to the television media event;
  aligning a subset of the candidate social media content items with the television media event based on the confidence scores;
  forming a population of authors comprising authors of the subset of the candidate social media content items;
  determining that the advertisement media event has aired during an airing of the television media event; and
  responsive to the airing of the advertisement media event, sending the population of authors a message.

2. The computer-executed method of claim 1, wherein determining that the advertisement media event has aired during the airing of the television media event comprises:
  extracting event features from metadata annotations associated with the media events;
  mapping the event features of the advertisement media event to the event features of the television media event, the event features including an airing time and date.

3. The computer-executed method of claim 1, further comprising determining that the advertisement media event is currently airing.

4. The computer-executed method of claim 1, wherein forming the population of authors comprises filtering the authors based on at least one selected from a group consisting of author demographic information, content of the candidate social media content items, and time when the candidate social media content items were created.

5. The method of claim 1, further comprising:
  extracting one or more features from the television media event, each feature describing an image or audio property of the television media event;

ranking a plurality of metadata instances based on a similarity between each metadata instance and at least one of the one or more features; and annotating the television media event with a highest-ranked metadata instance to create an annotated event.

6. The computer-executed method of claim 5, wherein determining the confidence score indicative of the probability that at least one of the candidate social media content items is relevant to the television media event further comprises:

extracting event features from the annotated event;

extracting social media features from the candidate social media content item; and identifying a relationship between the event features and social media features, the confidence score of the candidate social media content item being based at least partially on the relationship.

7. The method of claim 6, wherein identifying the relationship comprises identifying a correlation between a location specified by the event features and a location specified by the social media features and a correlation between an airing time specified by the event features and a publishing time specified by the social media features.

8. The method of claim 6, wherein identifying the relationship comprises analyzing the event features and authority features included in the social media features to determine a probability that an author of the social media content item would generate content about an event having the event features.

9. The method of claim 5, wherein each metadata instance includes content features extracted from one or more sample events associated with a different content domain.

10. The method of claim 9, wherein ranking the plurality of metadata instance is further based on a similarity between the content domain associated with the metadata instance and a content domain associated with the television media event.

11. A system for sending messages to authors of social media content items, the system comprising:

a computer processor; and a computer-readable storage medium storing computer program engines configured to execute on the computer processor, the computer program engines comprising:

an author store configured to identify a plurality of candidate social media content items broadcasted by a social media source;

an event airing engine configured to determine a plurality of media events from a time-based media source, the time-based media source independent from the social media source, and including a television media event and an advertisement media event;

a social media/event alignment engine configured to determine a confidence score for each of the candidate social media content items indicative of a probability that the candidate social media content item is relevant to the television media event and to align a subset of the candidate social media content items with the television media event based on the confidence scores; and an audience population engine configured to form a population of authors comprising the authors of the subset of the candidate social content items;

a television show/ad overlap engine configured to determine that the advertisement media event has aired during an airing of the television media event; and a message selection engine configured to send the population of authors a message responsive to the airing of the advertisement media event.

12. The system of claim 11, wherein to determine that the advertisement media event has aired during the airing of the television media event, the television show/ad overlap engine is configured to:

extract event features from metadata annotations associated with the media events;

map the event features of the advertisement media event to the event features of the television media event, the event features including an airing time and date.

13. The system of claim 11, wherein the television show/ad overlap engine is configured to determine that the advertisement media event has aired within the last minute.

14. The system of claim 11, wherein the television show audience aggregation engine is configured to form the population based on at least one selected from a group consisting of author demographic information, content of the candidate social media content items, and time when the candidate social media content items were created.

15. The system of claim 11, wherein the television show audience aggregation engine is configured to include in the population authors of candidate social media content items associated with the television media event, where the advertisement media event has aired during the television media event.

16. The system of claim 11, further comprising:

a feature extraction engine configured to extract one or more features from the television media event, each feature describing an image or audio property of the television media event; and a metadata alignment engine configured to:

rank a plurality of metadata instances based on a similarity between each metadata instance and at least one of the one or more features; and annotate the television media event with a highest-ranked metadata instance to create an annotated event.

17. The system of claim 16, wherein each metadata instance includes content features extracted from one or more sample events associated with a content domain.

18. The system of claim 17, wherein ranking the plurality of metadata instances is further based on a similarity between the content domain associated with the metadata instance and a content domain associated with the television media event.

19. The system of claim 17, wherein to determine the confidence score the social media/event alignment engine is configured to:

extract event features from the annotated event;

extract social media features from the candidate social content items; and identify a relationship between the event features and social media features, the confidence score of the candidate social media content item being based at least partially on the relationship.

20. The system of claim 19, wherein identifying the relationship comprises identifying co-occurring information within the event features and social media features.

21. The system of claim 19, wherein identifying the relationship comprises:

identifying a correlation between a location specified by the event features and a location specified by the social media features, and identifying a correlation between an airing time specified by the event features and a publishing time specified by the social media features.

22. The system of claim 19, wherein identifying the relationship comprises analyzing the event features and authority features included in the social media features to determine a probability that an author of the social media content item would generate content about an event having the event features.

23. A non-transitory computer-readable storage medium storing instructions that, when executed by a computer processor, cause the computer processor to perform the steps of:
- identifying a plurality of candidate social media content items broadcasted by a social media source;
- identifying a plurality of media events from a time-based media source, the time-based media source independent from the social media source, and the media events including a television media event and an advertisement media event;
- for each of the candidate social media content items, determining, using the computer processor, a confidence score indicative of a probability that the candidate social media content item is relevant to the television media event;
- aligning a subset of the candidate social media content items with the television media event based on the confidence scores;
- forming a population of authors comprising authors of the subset of the candidate social media content items;
- determining that the advertisement media event has aired during an airing of the television media event; and
- responsive to the airing of the advertisement media event, sending the population of authors a message.

* * * * *